BEST AVAILABLE COPY

DEFENSIVE PUBLICATION T856,038

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 26, 1968

856 O.G. 1019

~~556,587~~

PROCESS FOR THE PRODUCTION OF FAST BLACK DYEINGS WITH HALO-IMINO HETEROCYCLIC COMPOUNDS

John G. Fisher and James M. Straley, both % Tennessee Eastman Company, P.O. Box 511, Kingsport, Tenn. 37662

Filed June 10, 1966. Published Nov. 26, 1968
Class 8—32
No Drawing. 10 Pages Specification A method for producing black dyed polyacrylonitrile textile materials which comprises (1) pre-dyeing the fiber with an active hydrogen compound and (2) subsequently dyeing the fiber with a compound having the formula

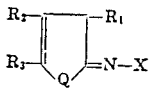

wherein $R_1$ is alkyl; $R_2$ and $R_3$ each is hydrogen, alkyl, or aryl, or when taken collectively $R_2$ and $R_3$ are the residue of a fused benzene ring; Q is an oxygen, sulfur or nitrogen atom; and X is halogen.

T856038
NO OR CLASSIF *** ***